United States Patent

Branch

[11] Patent Number: 5,257,892
[45] Date of Patent: Nov. 2, 1993

[54] MULTIPLE PURPOSE TRANSPORTING DEVICE

[76] Inventor: David Branch, 605 E. Ponderosa Pkwy., Flagstaff, Ariz. 86001

[21] Appl. No.: 787,530
[22] Filed: Nov. 4, 1991
[51] Int. Cl.$^5$ ............................................. B62B 3/02
[52] U.S. Cl. ..................... 414/490; 414/346; 414/908; 280/30; 280/47.18; 280/47.315
[58] Field of Search ............ 414/345, 346, 490, 498, 414/589, 908; 280/30, 47.18, 47.315, 47.27; 108/159

[56] References Cited

U.S. PATENT DOCUMENTS

| | | | |
|---|---|---|---|
| 704,426 | 7/1902 | Allen . | |
| 1,150,964 | 8/1915 | Phelps | 280/47.18 |
| 1,716,611 | 6/1929 | Wilson | 280/47.27 X |
| 1,828,434 | 10/1931 | Odell . | |
| 2,178,605 | 11/1939 | Pealer . | |
| 2,443,684 | 6/1948 | Lazarus | 414/908 X |
| 2,784,004 | 3/1957 | Hamrick | 280/30 |
| 2,820,643 | 1/1958 | Cohn | 280/47.27 X |
| 3,104,890 | 9/1963 | Hill | 280/47.18 X |
| 3,804,432 | 4/1974 | Lehrman | 280/654 |
| 4,220,346 | 9/1980 | Geschwender | 280/47.18 |
| 4,471,969 | 9/1984 | Zabala et al. | 280/30 |
| 4,565,382 | 1/1986 | Sherman | 280/47.18 |
| 4,593,883 | 6/1986 | Nelson | 414/911 X |
| 4,907,674 | 3/1990 | Miller | 182/150 |
| 4,921,270 | 5/1990 | Schoberg | 414/490 X |
| 4,934,718 | 6/1990 | Voegele | 108/12 X |
| 5,123,666 | 6/1992 | Moore | 414/446 X |

*Primary Examiner*—Michael S. Huppert
*Assistant Examiner*—Stephen T. Gordon
*Attorney, Agent, or Firm*—LaValle D. Ptak

[57] ABSTRACT

A pipe machine dolly/cart combination is designed with spaced-apart wheels at both ends of a load carrying platform. Removable handles are provided to permit the dolly/cart combination to be manipulated from both ends to be rolled about on a surface, and to be pivoted about the wheels on either end. With the handles attached to one end, the dolly/cart may be manipulated by a single person to permit the loading and unloading of the cart to and from a raised surface, such as the bed of a truck. When the removable handles are secured to the other end, the device may be used as a dolly to transport the load, and to deposit the load on a surface when the device is pivoted 90°. The device is ideally suited for facilitating the loading and unloading and transportation, by a single person, of a relatively heavy load, such as a pipe threading machine, or the like.

17 Claims, 2 Drawing Sheets

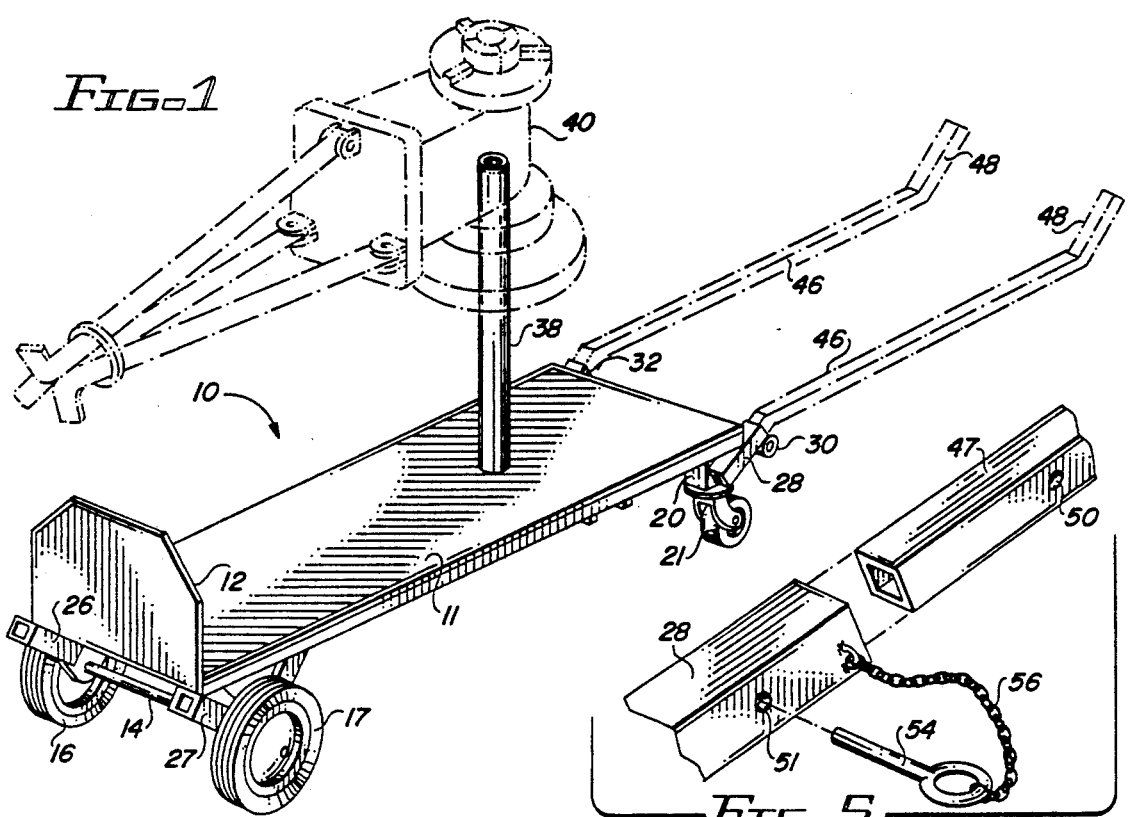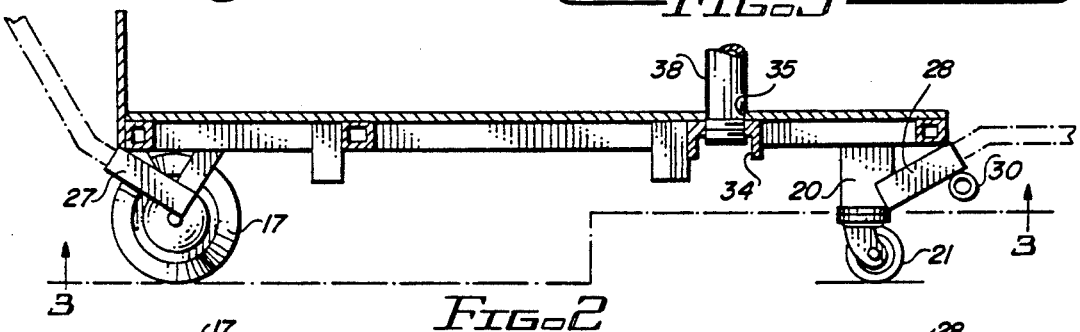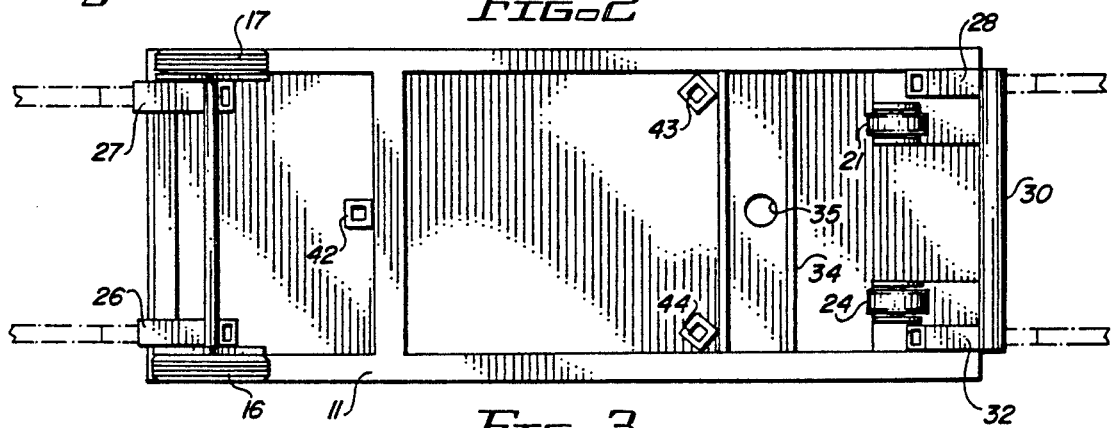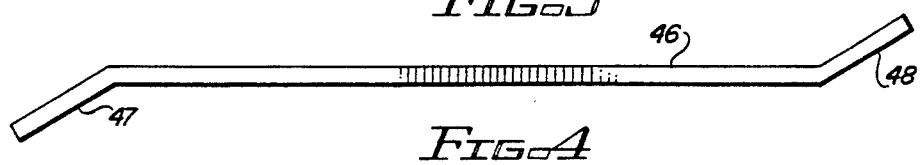

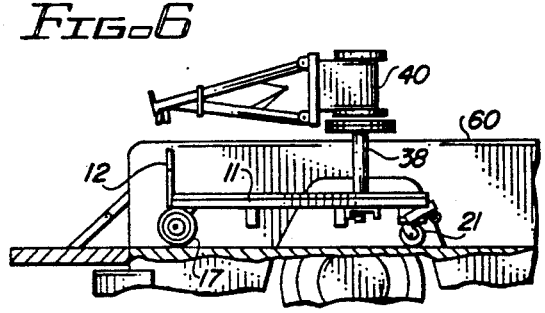
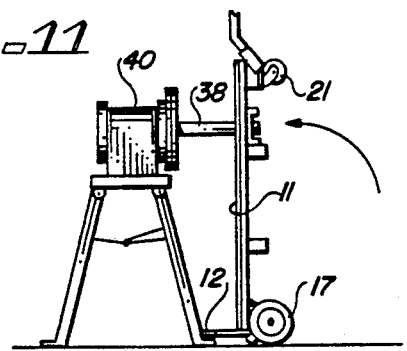
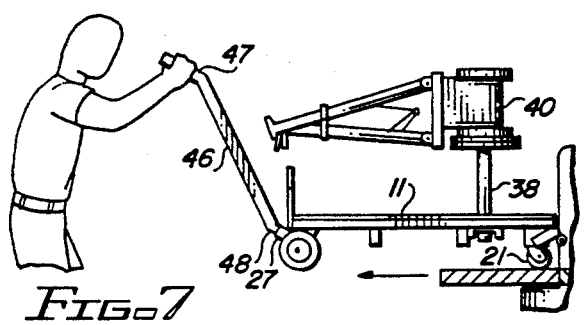
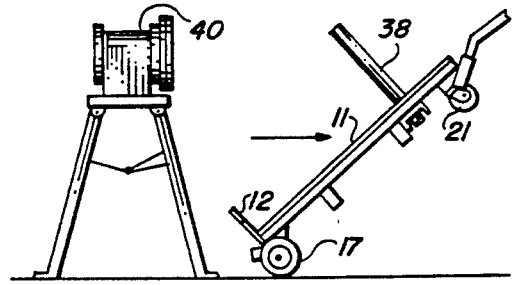
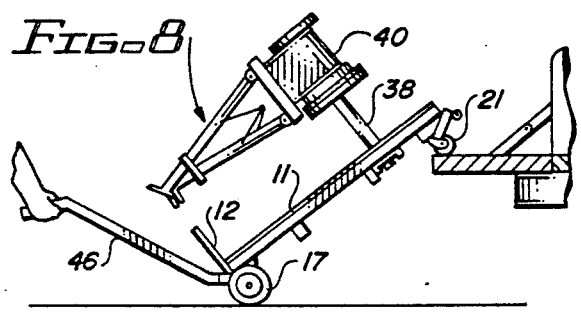
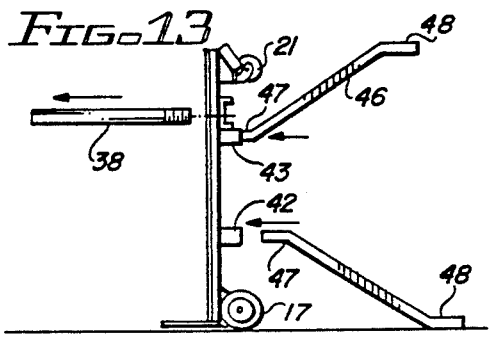
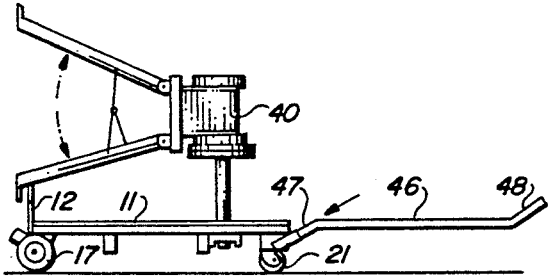
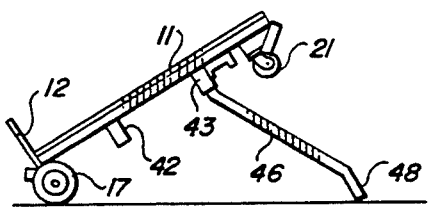
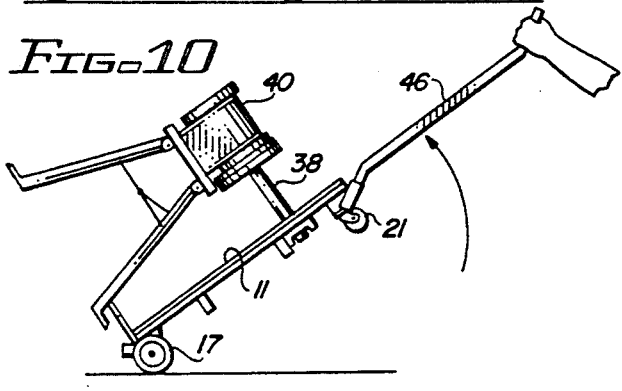
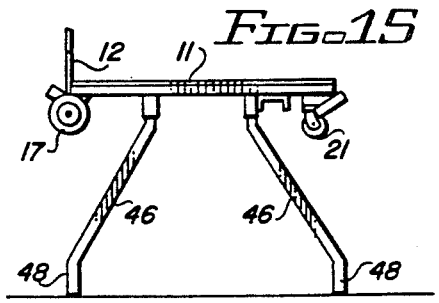

MULTIPLE PURPOSE TRANSPORTING DEVICE

BACKGROUND

Plumbers, pipe fitters, electricians, fire sprinkler fitters, steam fitters, and the like all use motor-driven tools at job sites to cut and thread pipe. Pipe threading machines are heavy (200 pounds or more), bulky machines, which, after they have been used, frequently are covered with oil. To safely move such machines about the job site, and from the job site to a pickup truck and vice-versa, two men are required. A single strong man may be able to move such machines, but only with the significant risk of back injuries or other injuries if the machine should slip from his grasp and fall. In addition, it is nearly impossible to avoid somewhat rough handling of the machine in the process of loading it into a truck, whether two men or one man attempts to undertake such loading. As a result, parts of the machines may be broken or damaged.

Typically, once the machine is at the job site, only a single person uses the machine; so that if it is necessary to move it from one position to another at the job site, the difficulty of manipulating and moving the heavy, bulky machine described above, once again is encountered. To avoid Workmen's Compensation claims and to facilitate the delivery, movement and return of such machines to and from job sites, most contractors send two workmen to the job site to effect the unloading, moving and loading of such machines, even though only one workman may be required at the job site. If only one workman is required at the job site, the second workman then must return to a different job site. The recovery for the wages of the second workman for this time must be made by the contractor, if his business is to remain profitable.

A manufacturer of pipe threading machines has developed a pair of wheels interconnected by an axle, with an upstanding pipe located on the axle midway between the wheels. The pipe is inserted into the pipe machine, which then is clamped onto the pipe. The machine then can be wheeled about from one point to another. To stand it up on its legs, however, requires two men to safely set the machine up. In addition, if the machine is to be loaded into a pickup truck, or unloaded from a pickup truck, it also must be lifted by two men (or wrestled in a dangerous manner by one man) in the same way as if the wheels were not present. In fact, the additional weight of the wheels further compounds the handling problem mentioned above, rather than providing a solution to it.

In the past, various devices have been developed for creating combined functions, such as a truck or cart and a table in a single unit. Four patents, disclosing such devices, are the patents to Allen No. 704,426; O'Dell No. 1,828,434; Pealer No. 2,178,605; and Sherman No. 4,565,382. The Allen patent is directed to a combination wheeled cart or litter carrier with a single large wheel located at its mid-point. Handles are provided at each end to permit two persons to roll and steer the cart over a surface. When a fixed location or semi-permanent location for the cart is located, four legs are folded down (much in the manner of a card table) to stabilize the cart and turn it into a table or stand. There is nothing in this patent, however, which suggests transferring a heavy object from a pickup truck to a lower surface in a manner which permits one person to do a job which typically requires two persons.

The patents to O'Dell, Pealer and Sherman all are directed to combined tables and hand trucks (O'Dell and Sherman), or a portable stand (Pealer) in which wheels are used in one mode of operation to move the device about, and in which various parts are moved to provide a flat table surface when rolling movement of the device no longer is required. Once again, there is nothing in any of these patents to suggest a device for loading and unloading heavy objects into and from a pickup truck by a single person, where two or more persons normally have been required.

Three other patents, Hamrick No. 2,784,004, Lehrman No. 3,804,432, and Geschwender No. 4,220,346, disclose hand trucks or dollies with various types of accessory folding members or extensions for creating a table. These devices, however, are not constructed for the purpose of facilitating the movement, loading and unloading of bulky, heavy objects by a single person.

It is desirable to provide a device for allowing a single person to move, load and unload heavy, bulky objects, such as pipe threading machines, which is simple to use, relatively inexpensive, and which overcomes the disadvantages of the prior art devices.

SUMMARY OF THE INVENTION

Accordingly, it is an object of this invention to provide an improved multi-purpose object transporting device.

It is another object of this invention to provide an improved combination hand-truck or dolly and cart for facilitating the handling of heavy, bulky objects.

It is an additional object of this invention to provide an improved dolly/cart/table device.

It is a further object of this invention to provide an improved dolly and cart for transporting heavy loads, which permits a single person to move the load from an elevated position, such as the bed of a pickup truck, to a lower position, such as the ground, and vice-versa, and to transport the load from one place to another with a minimum of effort.

In accordance with a preferred embodiment of this invention, a combined dolly and cart for transporting heavy loads comprises a load-carrying platform with first and second ends. The load is releaseably secured to the platform, and a first set of wheels are attached at one end of the platform. A second set of wheels are attached at the other end of the platform; so that the platform may be rolled over a surface as a cart when the platform is oriented substantially parallel to the surface. Removable handles are provided, and provisions are made to insert the handles into either of the first and second ends of the platform. A person then may either press down on or lift the handles to pivot the platform about the wheels on the opposite end to a variety of positions at an angle to the surface on which the platform is placed.

In a more specific embodiment, additional provision is made on the underside of the platform for releaseably receiving at least three handles to cause the handles to serve as legs, with the platform elevated to table height. Thus, a convenient work surface is provided when the dolly/cart device is used in this manner, after the load has been removed from it.

BRIEF DESCRIPTION OF THE DRAWINGS

FIG. 1 is a perspective view of a preferred embodiment of the invention;

FIG. 2 is a side view of the embodiment shown in FIG. 1;

FIG. 3 is a bottom view of the embodiment shown in FIG. 1;

FIG. 4 is a detailed view of the portion of the embodiment shown in FIG. 1;

FIG. 5 is a detailed perspective view of a feature of the embodiment of the invention shown in FIGS. 1 through 4;

FIGS. 6 through 12 are sequential diagrammatic representations illustrating the manner of use of the embodiment of the invention shown in FIGS. 1 through 5; and FIGS. 13 through 15 are a sequential diagrammatic representation of an additional feature of the embodiment of the invention shown in FIG. 1.

DETAILED DESCRIPTION

Reference now should be made to the drawings, in which the same reference numbers are used throughout the different figures to designate the same components.

FIG. 1 is a perspective view of a preferred embodiment of the invention. The transporting device 10 of the invention, essentially, comprises a combination dolly and cart, which has a main elongated rectangular platform 11 for carrying a load. A toe plate 12 is attached to one end of the platform 11 in the manner of conventional hand trucks or dollies. An axle 14 also is secured to this end, with a pair of wheels 16 and 17 mounted on the axle 14 to permit the dolly/cart 10 to be rolled about. At the other end, a pair of supports 20 are located on the opposite corners, and swivel wheels or casters 21 and 24 are mounted in them. This is shown most clearly in FIGS. 1, 2, and 3.

A relatively heavy support beam 34 extends across the underside of the platform 11 (as shown most clearly in FIG. 3), and this support beam 34 has a threaded hole 35 in it. A pipe 38, threaded on its lower end, then is threaded into the hole 35 to secure the pipe 38 to the platform 11 in the manner shown in FIGS. 1 and 2. When the device is used as a cart, as shown in FIGS. 1 and 2, a pipe threading machine 40 or similar device has the pipe 38 extended into the pipe opening of the machine; and the pipe threading machine 40 is clamped onto the pipe 38. Such a machine 40 is shown in dotted lines in FIG. 1 to indicate the relative position of the machine on the device 10.

A pair of removable handles, comprising a central section 46 with a downturned end 47 on one end and an upturned end 48 on the opposite end, then is provided for moving and manipulating the dolly/cart 10. One of these handles is illustrated in FIG. 4. Typically, the cross-sectional configuration of the handle is of rectangular steel tubing, such as shown most clearly in the partially cut away enlarged view of FIG. 5. One or the other of the ends 47 or 48 of a pair of handles are inserted into mating receptacles 26 and 27 on the left hand end of the platform 11, as shown in FIGS. 1, 2, and 3 or into receptacles 28 and 32 on the opposite end of the cart shown in FIGS. 1, 2, and 3 to allow a single person to move and manipulate the dolly/cart device 10. FIGS. 1, 2, and 3 all indicate a pair of handles, of the type shown in FIG. 4, inserted into the various receptacles 26, 27, 28, and 32 to illustrate the manner in which the handles may be used. The receptacles 28 and 30 are interconnected by a tubular steel pipe 30, which provides rigid support for these receptacles on the right-hand end of the platform 11.

FIG. 5 illustrates a detail of one of the ends 47, of a handle of the type shown in FIG. 4 and one of the receptacles 28, to show one technique which may be used to releasably lock the end 47 of the handle into the receptacle 28 to prevent it from being accidentally withdrawn. A hole 50 is provided through the end portion 47 of the handle, which is inserted into the receptacle 28 to line up with a hole 51 through the receptacle 28. A locking pin 54 then is inserted through the holes 51 and 50 to prevent the handle from being accidentally withdrawn from the receptacle. A keeper chain 56 is attached to one end of the pin 54 to prevent it from becoming lost. Other techniques also may be used to releasably secure the end 47 (or 48 which is constructed in a similar manner) of the handle in whichever receptacle it is inserted. A releasable connection, however, is desired, since the handles are moved from one end of the dolly/cart 10 to the other depending upon the mode of operation.

Reference now should be made to FIGS. 6 through 12, which illustrate the various positions of the handles and the dolly/cart for facilitating the unloading (or loading) of the cart with a heavy pipe threading machine 40 mounted on it, followed by the manipulations utilized to set up the machine 40 at the job site. A reversal of the sequence shown in FIGS. 6 through 12 is utilized to secure the pipe cutting machine 40 to the dolly/cart 10 and, subsequently, to load it back onto a pickup truck or other elevated surface.

FIG. 6 shows the dolly/cart 10 loaded into the bed of a pickup truck 60, with the platform 11 parallel to the bed of the truck, and with the four wheels 16, 17, 21 and 24 on the bed of the truck. The pipe 38, which is threaded into the hole 35 in the beam 34, extends vertically upwardly; and a pipe threading machine 40 is clamped onto the pipe 38. This is the position in which the pipe threading machine and dolly/cart are transported from one position to another. FIG. 7 illustrates the manner in which the dolly/cart is removed by a single person from the pickup truck bed. A pair of handles have the ends 48 inserted into the receptacles 26 and 27, and the person removing the dolly/cart from the truck pulls it outwardly in the direction of the arrow, as indicated. The wheels 21 and 24 support the main weight of the heavy pipe threading machine 40, and the handles act as extended lever arms to reduce the amount of weight which must be carried by the person pulling the cart out of the truck.

FIG. 8 shows the end of the cart with the toe plate 12 pulled to the maximum distance out of the truck, and with the wheels 16 and 17 lowered to the ground. Again, this is done by the person lowering the ends 47 of the handles to the position shown in FIG. 8. Since the wheels 21 and 24 continue to rest on the tailgate of the truck, the amount of weight actually being controlled by the person removing the pipe threading machine 40 from the truck is considerably less than if the machine 40 were lifted directly out of the truck.

From the position in FIG. 8, the person removing the dolly/cart pivots it on its wheels 16 and 17 a slight distance to the left, as shown in FIG. 8, to clear the wheels 21 and 24 from the edge of the tailgate of the truck. The wheels 21 and 24 then are lowered to the ground by releasing some of the downward force pressing on the handle ends 47 to place the dolly/cart in the cart position again, as shown in FIG. 9. With the handles in the position shown in FIG. 8, the dolly/cart can be moved about as a cart over the surface of the ground to a position where the pipe threading machine 40 is to be set up.

When the position for set-up of the pipe threading machine 40 is reached, the legs of the machine are unfolded as shown in FIG. 9, and the handles are removed from the receptacles 26 and 27, and are positioned as shown in FIG. 9, with the ends 47 inserted into the receptacles 28 and 32. The dolly/cart 10 then is lifted upwardly by grasping the handle ends 48, as illustrated in FIG. 10, to pivot the dolly/cart device about the wheels 16 and 17, as illustrated in FIG. 10. Once again, the length of the handles provides a long lever arm for this operation; so that the amount of weight actually being lifted by the user of the device is considerably less than if the pipe threading machine 40 were directly lifted or tipped into position in a conventional manner.

FIG. 11 shows the completion of the movement illustrated in FIG. 10, with the toe plate 12 of the dolly/cart on the ground and the legs of the pipe threading machine 40 now supporting the weight of the machine. It also should be noted that the wheels 16 and 17 of the dolly/cart are in engagement with the ground in this position; so that considerable stability is provided; and the dolly/cart can be pulled away on the wheels 16 and 17. Once the pipe threading machine 40 is in the position shown in FIG. 11, the jaws or clamps of the machine 40, which up to this point have tightly secured it to the pipe 38, are released. After this is done, as shown in FIG. 12, the dolly/cart is pulled away and then can be used in a conventional manner as a dolly or cart. To accomplish this, the pipe 38 is removed, as illustrated in FIG. 13, by unscrewing it from the threaded opening 35.

As illustrated in FIGS. 13, 14 and 15, the dolly/cart also may be employed as a work table, adjacent the work site or wherever else the workman may desire to have a work table, by inserting two of the handles into the receptacles 43 and 44 (FIGS. 13 and 14). The cart then is tipped into position and the third handle/leg is inserted into the receptacle 42, as shown in FIG. 15, to act as a table. This work table also may be equipped with a vise or other suitable tools may be clamped to it, if desired.

It should be noted that the relative length of the platform 11, which is illustrated in various drawings of this application, may be varied in accordance with the height of the pickup truck or other truck into which the pipe threading machine 40 is to be placed for transportation. For example, if the bed of the truck is at a greater relative distance above ground than the one illustrated in FIG. 8, a longer platform 11 may be employed. In all other respects, the device is operated and used in the same manner described above and illustrated in the drawings.

It also is possible to provide a hinged or folded-over top for the platform 11, which can be opened out to increase the area of the table top when the device is used in the position shown in FIG. 15, if desired. This modification will not in any way alter the basic operation and utilization of the dolly/cart/table device disclosed and described above.

Various changes and modifications will occur to those skilled in the art, without departing from the true scope of the invention. For example, the releasable securing mechanism, shown in FIG. 5 for holding the ends of the handles in place in the receptacles, may be modified to other mechanisms for accomplishing the same purpose. In addition, the particular configurations and relative sizes of the wheels used for the two ends of the dolly/cart may be varied in accordance with particular design considerations for specific applications. Also, while the foregoing description has been specifically directed to a configuration suitable for carrying a pipe threading machine, the overall concept may be used for transporting and manipulating a variety of relatively heavy loads. All of these changes, and others not mentioned here, clearly come within the scope of the invention as defined in the appended claims.

I claim:

1. A combination dolly and cart for transporting heavy loads such as a pipe threading machine, including in combination:

a load carrying platform having first and second ends;

a pipe segment secured to and extending from said platform for releaseably securing a pipe threading machine to said platform by clamping said pipe threading machine onto said pipe segment extended into said pipe threading machine;

a first wheel set attached at the first end of said platform;

a second wheel set attached at the second end of said platform, said first and second wheel sets permitting said platform to be rolled over a surface as a cart with the platform oriented substantially parallel to such surface;

a removable handle; and means at both the first and second ends of said platform for releaseably securing said handle to one of the first and second ends of said platform at a time to permit a person to manipulate said handle to pivot said platform about said first and second wheel sets to a variety of positions at an angle to said surface.

2. The combination according to claim 1 wherein said removable handle comprises first and second separate handle members, and said means for releaseably securing said handle at the first and second ends of said platform include first and second receptacles at each of the first and second ends of said platform for receiving said first and second handle members, respectively, to permit said dolly/cart to be pivoted on said surface and rolled over such surface by a person manipulating said first and second handle members.

3. The combinations according to claim 2 wherein said handle members and said receptacles for receiving said handle members are constructed to prevent rotation of said handle members in said receptacles.

4. The combination according to claim 3 wherein each of said handle members has a rectangular cross-sectional configuration in at least the portion thereof inserted into said receptacles, with said receptacles having a mating internal rectangular cross-sectional configuration.

5. The combination according to claim 4 further including means for securing said handle members in said receptacles.

6. The combination according to claim 5 wherein said carrying platform is an elongated rectangular platform.

7. The combination according to claim 6 further including a toe plate 12 attached to said first end of said platform and extending substantially perpendicularly to said platform opposite said first wheel set.

8. The combination according to claim 7 wherein said first wheel set comprises first and second spaced-apart wheels.

9. The combination according to claim 8 wherein said second wheel set comprises third and fourth independently mounted, spaced-apart swivel wheels.

10. The combination according to claim 9 further including at least three additional receptacles located on a side of said platform opposite a side to which a load is releaseably secured, said additional receptacles accommodating said handle members in a manner to serve as legs for a table with said platform elevated by said handle members to cause said first and second wheel sets to be lifted out of contact with said surface.

11. The combination according to claim 2 further including means for securing said handle members in said receptacles.

12. The combination according to claim 11 wherein each of said handle members has a rectangular cross-sectional configuration in at least the portion thereof inserted into said receptacles, with said receptacles having a mating internal rectangular cross-sectional configuration.

13. The combination according to claim 1 wherein said first wheel set comprises first and second spaced-apart wheels.

14. The combination according to claim 13 wherein said second wheel set comprises third and fourth independently mounted, spaced-apart swivel wheels.

15. The combination according to claim 1 wherein said carrying platform is an elongated rectangular platform having a top side and a bottom side.

16. The combination according to claim 15 wherein said first and second wheel sets are attached to the bottom side of said platform, and further including a toe plate 12 attached to said first end of said platform and extending substantially perpendicularly to said platform on the top side thereof opposite said first wheel set.

17. A combination dolly and cart for transporting heavy loads, including in combination:
a load carrying platform having first and second ends;
means for releaseably securing a load to said platform;
a first wheel set attached at the first end of said platform;
a second wheel set attached at the second end of said platform, said first and second wheel sets permitting said platform to be rolled over a surface as a cart with the platform oriented substantially parallel to such surface;
a plurality of removable handle members;
means at both the first and second ends of said platform for releaseably securing at least some of said handle members to permit a person to manipulate said handle members to pivot said platform about said first and second wheel sets to a variety of positions at an angle to said surface; and
at least three receptacles located on a side of said platform opposite a side to which a load is releaseably secured, said receptacles accommodating said handle members in a manner to serve as legs for a table with said platform elevated by said handle members to cause said first and second wheel sets to be lifted out of contact with said surface.

* * * * *